(12) United States Patent
Wiss et al.

(10) Patent No.: US 7,856,050 B1
(45) Date of Patent: Dec. 21, 2010

(54) RECEIVER AND TRANSMITTER CALIBRATION TO COMPENSATE FOR FREQUENCY DEPENDENT I/Q IMBALANCE

(75) Inventors: John Robert Wiss, Carlsbad, CA (US); Yuhui Marie Ren, San Diego, CA (US)

(73) Assignee: L-3 Communications Titan Corporation, San Diego, CA (US)

( * ) Notice: Subject to any disclaimer, the term of this patent is extended or adjusted under 35 U.S.C. 154(b) by 742 days.

(21) Appl. No.: 11/839,107

(22) Filed: Aug. 15, 2007

(51) Int. Cl.
*H04B 3/46* (2006.01)
*H04B 17/00* (2006.01)
*H04Q 1/20* (2006.01)

(52) U.S. Cl. .................. 375/224; 375/285; 375/296; 375/346; 375/344; 455/67.14; 455/115.2; 455/226.1

(58) Field of Classification Search ............ 375/224, 375/285, 295–296, 340, 344, 346; 455/67.13, 455/67.14, 115.1, 115.2, 182.1, 192.1, 226.1, 455/296; 324/76.11; 370/241
See application file for complete search history.

(56) References Cited

U.S. PATENT DOCUMENTS

| | | | | |
|---|---|---|---|---|
| 6,298,096 | B1 * | 10/2001 | Burgin | 375/296 |
| 7,069,284 | B2 * | 6/2006 | Peting | 708/300 |
| 7,251,291 | B1 * | 7/2007 | Dubuc et al. | 375/296 |
| 7,313,203 | B2 * | 12/2007 | Tubbax et al. | 375/316 |
| 7,620,124 | B2 * | 11/2009 | Coersmeier | 375/322 |
| 2003/0007574 | A1 * | 1/2003 | Li et al. | 375/316 |
| 2004/0203472 | A1 * | 10/2004 | Chien | 455/68 |
| 2008/0089443 | A1 * | 4/2008 | Sanada et al. | 375/319 |
| 2008/0165874 | A1 * | 7/2008 | Steele et al. | 375/261 |

OTHER PUBLICATIONS

Tsui, James,"Digital Techniques for Wideband Receivers" 1995, pp. 256-260, Artech House, Norwood, MA 02062 USA.

* cited by examiner

*Primary Examiner*—Jean B Corrielus
(74) *Attorney, Agent, or Firm*—Edward W. Callan

(57) ABSTRACT

A receiver, which is adapted for demodulating signal carriers at variable frequencies to provide received signals at a plurality of different received frequencies, is calibrated to compensate for a frequency-dependent imbalance in the amplitude and/or the quadrature phase of analog in-phase (I) and quadrature (Q) received-signal components that have passed through receiver circuit paths that may cause such imbalance. I-channel and Q-channel Rx-correction coefficients for each of a plurality of different calibration frequencies are estimated and stored in a lookup table. Rx-correction coefficients for a calibration frequency or frequencies that are the same as or closest to the received frequency or frequencies are accessed from the lookup table and combined with digital I and Q components of received signals that have been provided by analog-to-digital conversion of analog I and Q components of received signals that have passed through the imbalance-causing receiver circuit paths upon demodulation at the received frequency.

24 Claims, 4 Drawing Sheets

RECEIVER AND TRANSMITTER CALIBRATION TO COMPENSATE FOR FREQUENCY DEPENDENT I/Q IMBALANCE

BACKGROUND OF THE INVENTION

The present invention generally pertains to calibration of receivers and transmitters and is particularly directed to calibration of receivers and transmitters to compensate for frequency dependent I/Q imbalance.

An I/Q imbalance occurs when there are amplitude and phase imbalances in the amplitude and/or the quadrature phase of analog in-phase (I) and quadrature (Q) signal components. Frequency dependent I and Q imbalances may be caused by frequency sensitive elements, such as filters, within circuit paths through which the analog I and Q components pass.

The amplitude error is manifested as a signal gain at the image frequency of the signal frequency. The image frequency is a frequency at which an image of a signal at a desired signal frequency also occurs.

The I/Q imbalance is worse in a wideband system that is adapted for demodulating one or more of a plurality of signal carriers at different frequencies than in a system that is adapted for demodulating a signal carrier at a single predetermined frequency, since the single-frequency system can readily filter the signal so that the image frequency is outside of the band of interest.

Calibration of a receiver to compensate for a frequency-dependent imbalance in the amplitude and/or the quadrature phase of analog in-phase I and Q signal components is described in "Digital Techniques for Wideband Receivers" by James Tsui, pp. 256-260, Artech House, 1995. Tsui states that if the imbalance can be measured, it can be corrected. Tsui then proceeds to derive equations for estimating correction coefficients by processing metrics which are produced by sampling the I and Q components four times at a sampling rate that is four times the input frequency. The metrics that are used to estimate the correction coefficients include $S(0)$, $S(1)$ and $S(3)$. $S(0)$ is a measurement of the DC offset of the particular I/Q component; $S(1)$ is a measurement of the gain of the particular I/Q component at the input frequency; and $S(3)$ is a measurement of the gain of the particular I/Q component at the image frequency. An I-channel correction coefficient is estimated by calculating:

$$E = -\mathrm{Re}\left[\frac{2S_t(3)}{S_t^*(1) + S_t(3)}\right]$$

A Q-channel correction coefficient is estimated by calculating:

$$P = -\mathrm{Im}\left[\frac{2S_t(3)}{S_t^*(1) + S_t(3)}\right]$$

where: $S_t^*(1)$ is the conjugate of $S(1)$.

Tsui states that his correction method should be tested at different frequencies and that the correction can be applied one frequency at a time. Tusi further states that his calibration method might be tedious to apply.

It is also known to calibrate a transmitter to compensate for a frequency-dependent imbalance in the amplitude and/or the quadrature phase of analog in-phase I and Q signal components that are passed through transmitter circuit paths that may cause said imbalance.

SUMMARY OF THE INVENTION

In one aspect, the present invention provides a method of calibrating a receiver (Rx) to compensate for a frequency-dependent imbalance in the amplitude and/or the quadrature phase of analog in-phase (I) and quadrature (Q) received-signal components that have passed through receiver circuit paths that cause said imbalance, wherein the receiver is adapted for demodulating signal carriers at variable frequencies to provide received signals at one or more of a plurality of different received frequencies, the method comprising the steps of:

(a) processing samples of digital I and Q components of Rx-test signals generated at a plurality of different calibration frequencies within an Rx-calibration bandwidth to thereby estimate I-channel and Q-channel Rx-correction coefficients for each of the different calibration frequencies, wherein the digital I and Q components are provided by analog-to-digital conversion of analog I and Q components of the Rx-test signals that have been passed through said receiver circuit paths;

(b) in a look-up table, storing the estimated Rx-correction coefficients for the different calibration frequencies within the Rx-calibration bandwidth;

(c) from the look-up table, accessing estimated Rx-correction coefficients for calibrating the receiver for one or more of a plurality of signals at different received frequencies within the Rx-calibration bandwidth, by selecting the estimated Rx-correction coefficients for the calibration frequency or frequencies within the Rx-calibration bandwidth that are the same as or closest to the respective received frequency or frequencies; and (d) using the accessed Rx-correction coefficients to calibrate the receiver so that for the respective received frequency or frequencies the accessed estimated I-channel and Q-channel Rx-correction coefficients are combined with digital I and Q components of received signals that have been provided by analog-to-digital conversion of analog I and Q components of received signals that have passed through said receiver circuit paths upon demodulation at the received frequency.

In another aspect, the present invention provides a method of calibrating a transmitter (Tx) to compensate for a frequency-dependent imbalance in the amplitude and/or the quadrature phase of analog in-phase (I) and quadrature (Q) signal components that are passed through transmitter circuit paths that cause said imbalance, wherein the transmitter is adapted for modulating one or more signal carriers for transmission with modulating signals that are provided at variable modulation frequencies, the method comprising the steps of:

(a) providing samples of at least the digital I components of demodulated Tx-test signals at a plurality of different calibration frequencies within a Tx-calibration bandwidth, wherein the samples of the digital I components of the demodulated Tx-test signals are provided by analog-to-digital conversion of the analog I components of demodulated Tx-test signals that are demodulated from signal carriers that are modulated at the different calibration frequencies by analog I and Q components that are passed through said transmitter circuit paths;

(b) processing the samples to estimate I-channel and Q-channel Tx-correction coefficients at each of the different calibration frequencies within the Tx-calibration bandwidth;

(c) in a look-up table, storing the estimated Tx-correction coefficients for the different calibration frequencies within the Tx-calibration bandwidth;

(d) from the look-up table, accessing estimated Tx-correction coefficients for calibrating the transmitter for one or more of a plurality of different modulation frequencies within the Tx-calibration bandwidth, by selecting the estimated Tx-correction coefficients for the calibration frequency or frequencies within the Tx-calibration bandwidth that are the same as or closest to the respective modulation frequency or frequencies; and (e) using the accessed Tx-correction coefficients to calibrate the transmitter so that for the respective modulation frequency or frequencies of the transmitter, the accessed estimated I-channel and Q-channel Tx-correction coefficients are combined with digital I and Q components of a modulation signal before said digital components are converted to analog components that pass through the transmitter circuit paths.

The transmitter and the receiver are calibrated independently since they can impair the transmitted and received signals in different ways.

Additional features of the present invention are described with reference to the detailed description of the preferred embodiments.

DETAILED DESCRIPTION

Figure 1:
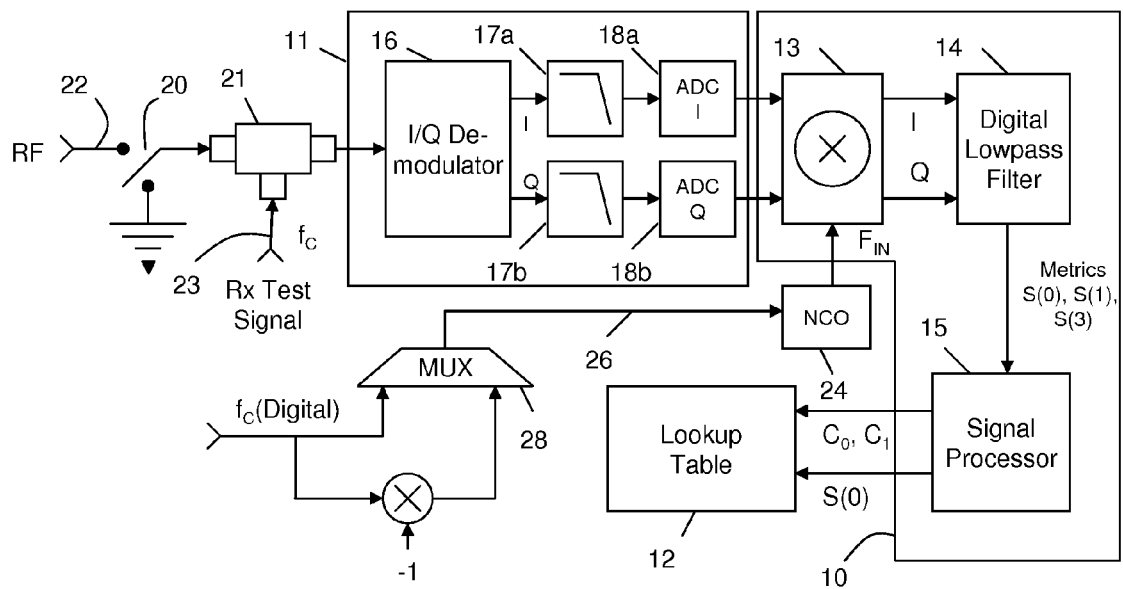
FIG. 1 is a block diagram of a preferred embodiment of a system for estimating Rx-correction coefficients for calibrating a receiver that is adapted for demodulating one or more of a plurality of signal carriers at different frequencies.

FIG. 1 shows a preferred embodiment of a system 10 for estimating Rx-correction coefficients $C_0$, $C_1$ for calibrating a receiver 11 to compensate for a frequency-dependent imbalance in the amplitude and/or the quadrature phase of analog in-phase (I) and quadrature (Q) received-signal components that have passed through receiver circuit paths that may cause such an imbalance. The estimated Rx-correction coefficients $C_0$, $C_1$ are stored in a lookup table 12. The system 10 includes a mixer 13, a digital filter 14 and a signal processor 15. In a preferred embodiment, the mixer 13, the digital filter 14 and the lookup table 12 are included in a field programmable gate array FPGA. In alternative embodiments FPGA technology is not utilized. In one alternative embodiment, the lookup table 12 is included in the signal processor 15.

In at least one embodiment, at least a portion of the Rx-correction-coefficient-estimation system 10 is embodied in at least one computer, such as a microprocessor. A computer readable medium, which is provided for use with the computer, contains program instructions for causing the computer to perform one or more functions of the system 10, including at least the functions performed by the signal processor 15; and preferably also the functions performed by the mixer 13 and/or the digital filter 14 In alternative embodiments, no portion of the mixer 13 and the digital filter 14 is embodied in a computer. As used herein, the term computer readable medium is not limited to one computer readable medium, but may also be interpreted to mean a plurality of computer readable media.

The receiver 11 is adapted for demodulating signal carriers at variable frequencies to provide received signals at one or more of a plurality of different received frequencies. The receiver 11 includes an I/Q demodulator (tuner) 16, an I-channel low pass filter 17a, an I-channel analog-to-digital converter (ADC) 18a, a Q-channel low pass filter 17b and a Q-channel ADC 18b. An I/Q demodulator is sometimes referred to as an I/Q splitter or an I/Q preselector. The receiver 11 can be tuned by the I/Q demodulator to simultaneously provide received signals at a plurality of different received frequencies within a predetermined bandwidth. The receiver 11 also includes additional apparatus (not shown) for further demodulating the received signals to a baseband frequency.

The Rx-correction-coefficient-estimation system 10 estimates the Rx-correction coefficients $C_0$, $C_1$ at a plurality of different calibration frequencies within an Rx-calibration bandwidth by processing samples of digital I and Q components of Rx-test signals generated at the different calibration frequencies. These digital I and Q components are provided by analog-to-digital conversion of analog I and Q components of the Rx-test signals that have been passed through said receiver circuit paths.

The Rx-test signals are provided by using the receiver 11, a switch 20 and a coupler 21. The switch 20 and the coupler 21 are connected between the input of the demodulator 16 and an RF/IF input terminal 22 to which the receiver 11 normally is connected for receiving input signals. The switch 20 is positioned so that a test signal 23 at a variable calibration frequency $f_C$ within the calibration bandwidth is provided to the input of the demodulator 16, with the rest of the RF/IF chain being bypassed. The reason for providing a test signal directly to the demodulator input and bypassing the Tx-chain instead of transmitting a test signal through the Tx-chain to the demodulator input is to determine the imbalance effects of the receiver analog circuit independent of the imbalance effects of the transmitter analog circuit paths.

Figure 2:
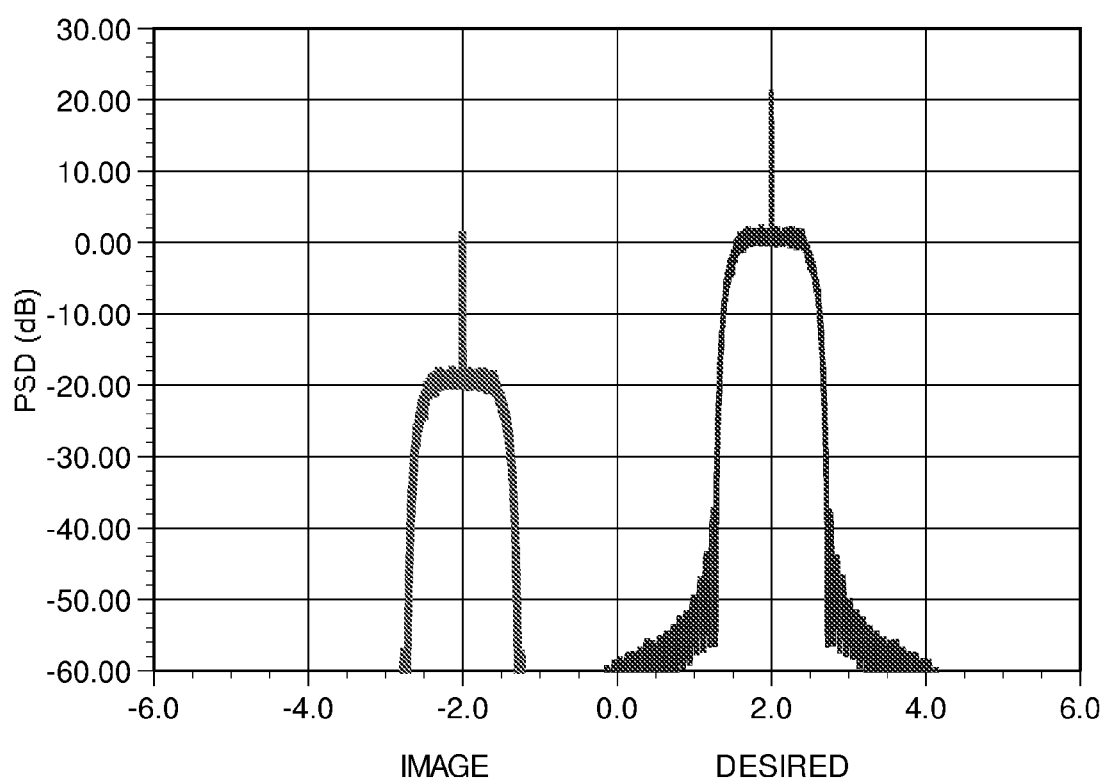
FIG. 2 is a graph showing the effect of a frequency-dependent imbalance in the amplitude and/or the quadrature phase of analog I and Q signal components that have been passed through receiver circuit paths.

Analog I and Q components of the Rx-test signal 23 generated at a selected Rx-calibration frequency $f_C$ are passed through receiver circuit paths that include the respective I-channel filter 17a and the Q-channel filter 17b and then converted to digital I and Q components by the respective I-channel ADC 18a and the Q-channel ADC 18b. There may be a frequency-dependent imbalance in the amplitude and/or the quadrature phase of the analog I and Q signal components that have been passed through the demodulator 16 and the I-channel filter 17a, the I-channel ADC 18a, the Q-channel filter 17b and the Q-channel ADC 18b. The effect of such an imbalance is shown in FIG. 2, wherein an image of a signal at a desired signal frequency also occurs at an image frequency.

Referring again to the Rx-correction-coefficient-estimation system 10, in one embodiment the mixer 13 is embodied as a phase rotator. In other embodiments other types of mixers may be used. The mixer 13 is connected for mixing the respective outputs of the respective I-channel ADC 18*a* and the Q-channel ADC 18*b* with a signal received from a numerically-controlled oscillator (NCO) 24 at an input frequency $f_{IN}$. The NCO 24 is controlled by a digital word 26 representing either the calibration frequency $f_C$ of the test signal or minus $f_C$. A digital multiplier 27 and a multiplexer 28 are utilized to provide the digital word 26 at $+/-f_C$, as shown in FIG. 1, so that the input frequency $f_{IN}$ is at either the calibration frequency $f_C$ or minus $f_C$.

Samples of the respective digital I and Q components of Rx-test signals generated at a plurality of different calibration frequencies within the Rx-calibration bandwidth are processed by the mixer 13, the digital filter 14 and the signal processor 15 to estimate I-channel and Q-channel Rx-correction coefficients $C_0$, $C_1$ for each of the different calibration frequencies $f_C$.

Figure 3A:
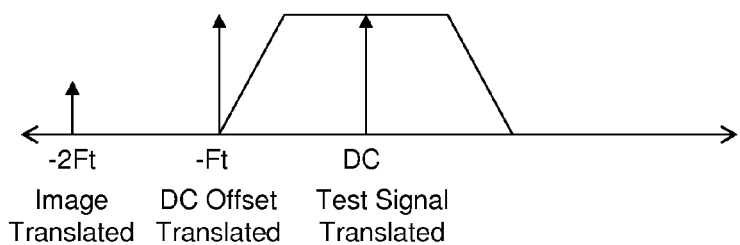
FIGS. 3A, 3B and 3C illustrates the positions on the frequency axis at which the measurements of the metrics are made by the digital filter in the system shown in FIG. 1.
Figure 3B:
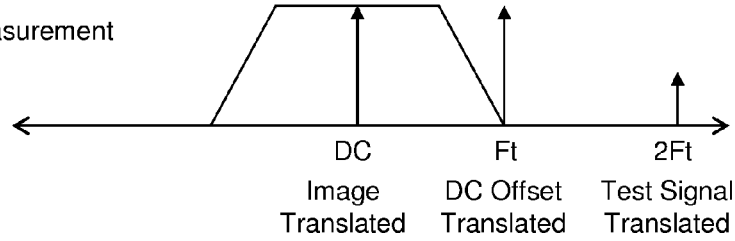

The mixer 13 mixes the respective digital I and Q components from the I-channel ADC 18*a* and the Q-channel ADC 18*b* with the signal provided from a numerically-controlled oscillator (NCO) 24 at an input frequency $F_{IN}$ of either the calibration frequency $f_C$ or minus $f_C$ to provide mixed samples at DC, as shown in FIGS. 3A and 3B.

When the respective digital I and Q components are mixed with a signal at the calibration frequency $f_C$, mixed samples for the selected Rx-calibration frequency are provided by the mixer 13 at DC, as shown in FIG. 3A, to facilitate measurement of a first metric S(1).

When the respective digital I and Q components are mixed with a signal at minus $f_C$, mixed samples for the image of the selected Rx-calibration frequency are provided by the mixer 13 at DC, as shown in FIG. 3B, to facilitate measurement of a second metric S(3).

Figure 3C:
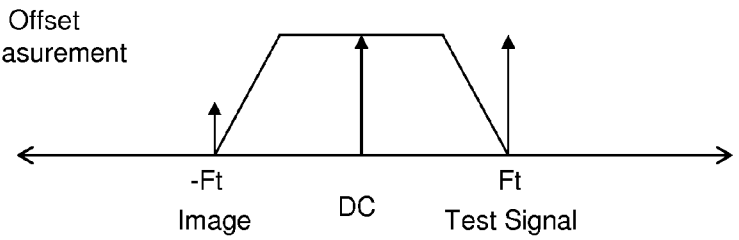

When no Rx-test signal is input to the demodulator 16 through the coupler 21, samples of the DC offset of the respective I and Q circuit paths are provided by the mixer 13 at DC, as shown in FIG. 3C, to facilitate measurement of a third metric S(0).

The digital filter 14 filters the mixed samples at DC to provide the metrics S(1) and S(3) that are used by the signal processor 15 to estimate the Rx-correction coefficients $C_0$, $C_1$ for each of the different calibration frequencies $f_C$. The digital filter 14 performs an integrate-and-dump function to filter the mixed samples of the respective I and Q components and thereby separately provide for the respective I and Q components the metric S(1), which is an integrated measured value of the mixed samples for the selected Rx-calibration frequency at DC, and the metric S(3), which is an integrated measured value of the mixed samples for the image of the selected Rx-calibration frequency at DC.

The digital filter 14 also filters the samples of the DC offset at DC by performing the same integrate-and-dump function to thereby provide for the respective I and Q components the metric S(0), which is a measurement of the DC offset of the particular I/Q component. The DC offset of the receiver 11 is measured with the receive path terminated in a matched load.

The digital filter 14 has high rejection at the positions of the translated DC offsets shown in FIGS. 3A and 3B. It is optimal for the filter 14 to have an amplitude response of zero at the exact translated DC offset frequencies. The integrate-and-dump filter operation has nulls at the desired points in accordance with the sampling rate. The calibration test frequencies are integer divisors of the sampling rate. For a frequency range of interest of 125 MHz and a sampling rate of 250 MHz, it is convenient to filter samples having calibration test frequencies in a range of having 5 MHz from 0 to 65 MHz, with the different calibration test frequencies being provided at 5 MHz increments. For a notional digital filter wherein the measurements are made by mixing digitally to the calibration test frequencies, it is preferable that the nulls are at every frequency $$N \cdot \frac{F_{Samp}}{K},$$

where for 5 MHz lattice spacing, K=50 and N≠0. Alternatively, K=100 and the different calibration test frequencies being provided at 2.5 MHz increments.

The metrics S(0), S(1), S(3) produced by the digital filter 14 are not the same as the metrics S(0), S(1), S(3) described by Tsui. These metrics are produced in accordance with the present invention by a method that is different and believed to facilitate estimation of correction coefficients that are more accurate in relation to the method described by Tsui for producing these metrics. Notwithstanding these differences, Tsui's notation is used herein to facilitate a comparison of the different metrics of the present invention and Tsui and the methods for producing the same.

Tsui states that the respective digital I and Q components can be expressed as:

$$s(t) = \{(1+\alpha_{IMB})\cos(2\pi ft+\phi_0)+a\} + j \cdot \{\sin(2\pi ft+\phi_0+\phi_{IMB})+b\} \quad \text{[Eq. 1]}$$

where:

$\phi_0$ is an arbitrary phase offset, a+jb is the DC offset due to the ADCs, $\alpha_{IMB}$ is the amplitude imbalance between the I and Q branches, and $\phi_{IMB}$ is the quadrature phase imbalance between the I and Q axes.

In accordance with the method of present invention for producing S(1), $$S(1) = \exp(-j \cdot 2\pi \text{ft}) \cdot s(t) \quad \text{[Eq. 2]}$$

$$S(1) = \left(\frac{1+\alpha_{IMB}}{2}\right)(\exp(j \cdot \phi_0) + \exp[-j \cdot (4\pi \text{ft} + \phi_0)]) + \left(\frac{1}{2}\right)$$

$$(\exp[j \cdot (\phi_0 + \phi_{IMB})] - \exp[-j \cdot (4\pi \text{ft} + \phi_0 + \phi_{IMB})]) +$$

$$(a + j \cdot b)\exp(-j \cdot 2\pi \text{ft})$$

Referring to Equation 2, it is seen that there are three main terms: the test signal at DC, a double frequency tone that represents the image at a frequency $-4\pi f_C t$, and the mixed DC offset term (which will typically is much larger than the image) at a frequency $-2\pi f_C t$. Since the DC term is closest to the frequency of the test signal we are interested in estimating we must filter to eliminate it to a level much lower than the image (which may be 30 dB down from the desired tone). Thus the optimal thing would be to use a digital filter with nulls at both undesired places.

Now assuming we have filtered the signal we will obtain about the DC term:

$$S(1) = \left(\frac{1+\alpha_{IMB}}{2}\right)\exp(j \cdot \phi_0) + \left(\frac{1}{2}\right)\exp[j \cdot (\phi_0 + \phi_{IMB})] + N_{F1} \quad \text{[Eq. 3]}$$

where: $N_{F1}$ represents leakage from the DC offset tone into the measurement BW of the digital filter.

In accordance with the method of present invention for producing S(3), $$S(3) = \exp(+j \cdot 2\pi f t) \cdot s(t) \quad [\text{Eq. 4}]$$

Simplifying by implementing the digital filter as noted above we obtain:

$$S(3) = \left(\frac{1 + \alpha_{IMB}}{2}\right) \exp(-j \cdot \phi_0) - \left(\frac{1}{2}\right) \exp[-j \cdot (\phi_0 + \phi_{IMB})] + N_{F2} \quad [\text{Eq. 5}]$$

where: $N_{F2}$ represents leakage from the DC offset tone into the measurement BW of the digital filter.

The signal processor 15 estimates the I-channel correction coefficient, $C_0$ by calculating:

$$1 - \text{Re}\left\{\frac{2 \cdot S(3)}{S*(1) + S(3)}\right\} = \quad [\text{Eq. 6}]$$
$$1 - \frac{2[S_I^2(3) + S_Q^2(3) + S_I(3)S_I(1) - S_Q(3)S_Q(1)]}{[S_I(1) + S_I(3)]^2 + [S_Q(3) - S_Q(1)]^2},$$

where: $S^*(\mathbf{1})$ is the conjugate of $S(\mathbf{1})$, $S_I(\mathbf{1})$ is the filtered $S(\mathbf{1})$ I metric, $S_Q(\mathbf{1})$ is the filtered $S(\mathbf{1})$ Q metric, $S_I(\mathbf{3})$ is the filtered $S(\mathbf{3})$ I metric, and $S_Q(\mathbf{3})$ is the filtered $S(\mathbf{3})$ Q metric.

The signal processor 15 estimates the Q-channel Rx-correction coefficient, $C_1$ by calculating:

$$-\text{Im}\left\{\frac{2 \cdot S(3)}{S*(1) + S(3)}\right\} = \quad [\text{Eq. 7}]$$
$$1 - \frac{2[S_I(3)S_Q(1) + S_Q(3)S_I(1)]}{[S_I(1) + S_I(3)]^2 + [S_Q(3) - S_Q(1)]^2}$$

In the preferred embodiment, the signal processor uses floating point arithmetic to calculate the Rx-correction coefficients $C_0$, and $C_1$. In other embodiments other arithmetic methods may used.

The signal processor 15 causes estimated Rx-correction coefficients $C_0$, $C_1$ for each of the different calibration frequencies $f_C$ within the Rx-calibration bandwidth to be stored in the lookup table 12.

The signal processor 15 also causes the I and Q-channel metrics S(0) for the DC offset to be stored in the lookup table 12. The same metric S(0) for the respective I/Q-channel is applicable for all of the different calibration frequencies.

Figure 4:
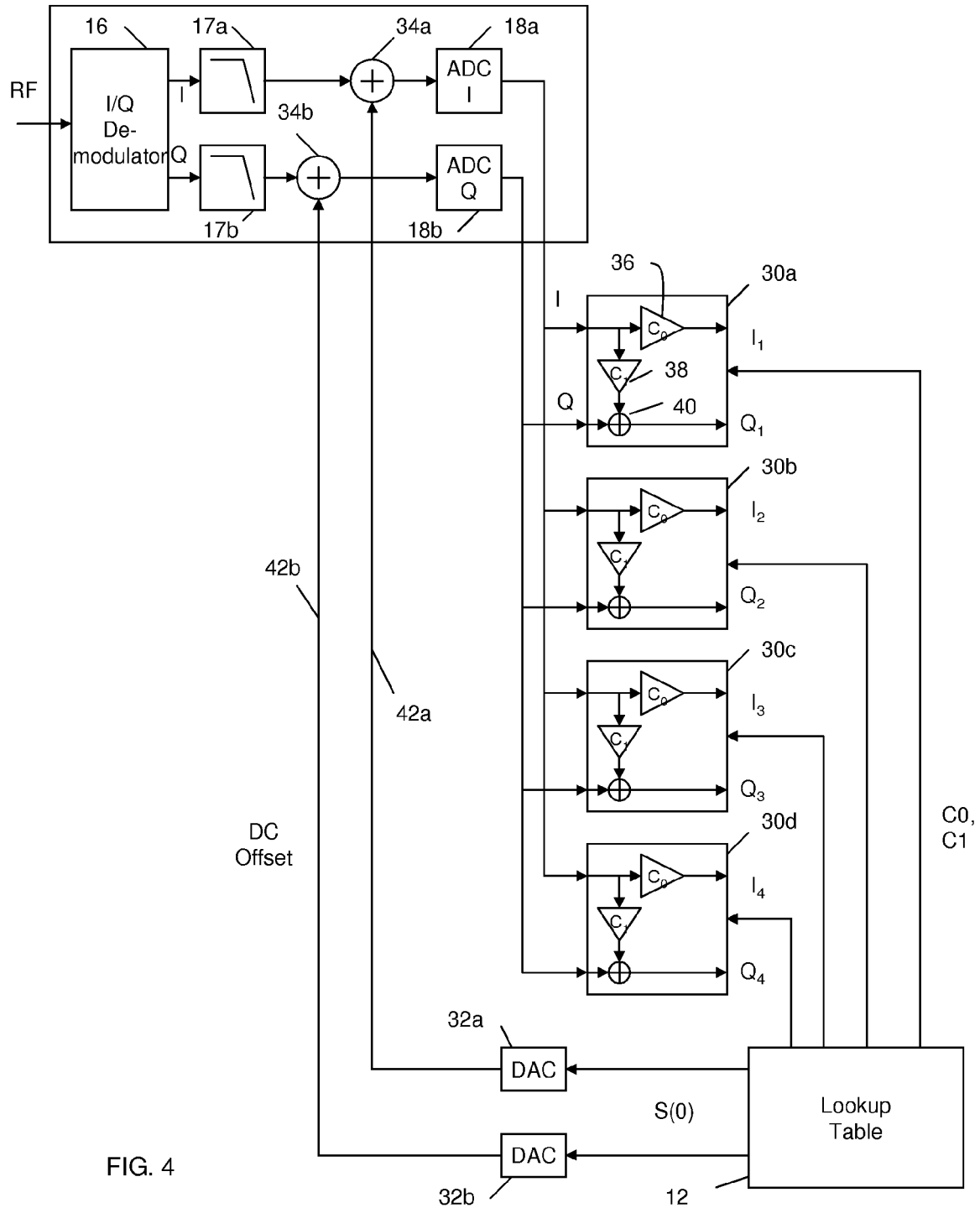
FIG. 4 is a block diagram of a preferred embodiment of a system for calibrating the receiver shown in FIG. 1.

Referring to FIG. 4, a preferred embodiment of a system for calibrating the receiver 11 includes a plurality of rebalancing circuits 30a, 30, 30c, 30d, a first analog digital-to-analog converter (DAC) 32a, a second DAC 32b, an I-channel analog addition unit 34a, a Q-channel analog addition unit 34b and the lookup table 12. The I-channel analog addition unit 34a is connected between the output of the I-channel low pass filter 17a of the receiver and the input of the I-channel ADC 18a of the receiver. The Q-channel analog addition unit 34b is connected between the output of the Q-channel low pass filter 17b of the receiver and the input of the Q-channel ADC 18b of the receiver.

Each of the rebalancing circuits 30a, 30b, 30c, 30d is calibrated to compensate for frequency-dependent imbalance at a respectively different selected calibration frequency.

Each rebalancing circuit 30a, 30, 30c, 30d includes a first digital amplifier 36, a second digital amplifier 38 and a digital adder 40.

In alternative embodiments (not shown), there may be other than four rebalancing circuits. The number of rebalancing circuits may be in accordance with the number of received frequencies at which the receiver is adapted for demodulating the signal carrier when such number is fixed. For example, in an embodiment in which the receiver is adapted for demodulating a carrier signal to provide received signals at a single received frequency, there is only one rebalancing circuit.

The metric S(0) for the I-channel is converted by the DAC 32a to provide an analog DC offset signal 42a. The analog DC offset signal 42a is added by the I-channel analog addition unit 34a to the analog I-component of the received signal provided from the output of the low pass filter 17a of the receiver to compensate for the DC offset of the low pass filter 17a. The metric S(0) for the Q-channel is converted by the DAC 32b to provide an analog DC offset signal 42b. The analog DC offset signal 42b is added by the Q-channel analog addition unit 34b to the analog I-component of the received signal provided from the output of the low pass filter 17b of the receiver to compensate for the DC offset of the low pass filter 17b.

The look-up table 12 is accessed to provide the estimated Rx-correction coefficients $C_0$, $C_1$ for calibrating the receiver 11 for one or more of a plurality of different received frequencies within the Rx-calibration bandwidth, by selecting the estimated Rx-correction coefficients for the calibration frequency or frequencies within the Rx-calibration bandwidth that are the same as or closest to the respective received frequency or frequencies. The accessed estimated Rx-correction coefficients $C_0$, $C_1$ for a particular selected one of the different calibration frequencies are provided respectively to the first amplifier 36 and the second amplifier 38 of the particular rebalancing circuit that is calibrated to compensate for frequency-dependent imbalance at the particular selected calibration frequency.

The rebalancing circuits 30a, 30, 30c, 30d use the accessed Rx-correction coefficients to calibrate the receiver 11 so that for the respective received frequency or frequencies the accessed estimated I-channel and Q-channel Rx-correction coefficients are combined with digital I and Q components of received signals that have been provided by analog-to-digital conversion of analog I and Q components of received signals that have passed through the receiver circuit paths 16, 17a, 18a, 17b, 18b.

In each rebalancing circuit 30a, 30, 30c, 30d, the first amplifier 36 is connected for amplifying the digital I-component of the signal provided from the output of the I-channel ADC 18a of the receiver 11 by the I-channel Rx-correction coefficient $C_0$; the second amplifier 38 is connected for amplifying the digital I-component of the signal provided from the output of the I-channel ADC 18a by the Q-channel Rx-correction coefficient $C_1$; and the digital adder 40 is connected for adding the value of the output of the second digital adder 38 to the value of the digital Q-component of the signal provided from the output of the Q-channel ADC 18b.

The output of the first digital amplifier 36 provides a calibrated digital I-component $I_1$, $I_2$, $I_3$, $I_4$ of a signal at a particular selected one of the calibration frequencies. The output of the digital adder 40 provides a calibrated digital Q-component $Q_1$, $Q_2$, $Q_3$, $Q_4$ of the signal at the particular selected one of the calibration frequencies.

In at least one embodiment, at least a portion of the rebalancing circuits 30a, 30, 30c, 30d and/or the frequency detection unit 44 are embodied in at least one computer, such as a microprocessor. A computer readable medium, which is provided for use with the computer, contains program instructions for causing the computer to perform one or more functions of the rebalancing circuits 30a, 30, 30c, 30d and the frequency detection unit 44. In alternative embodiments, no portion of the rebalancing circuits 30a, 30, 30c, 30d and/or the frequency detection unit 44 is embodied in a computer.

Figure 5:
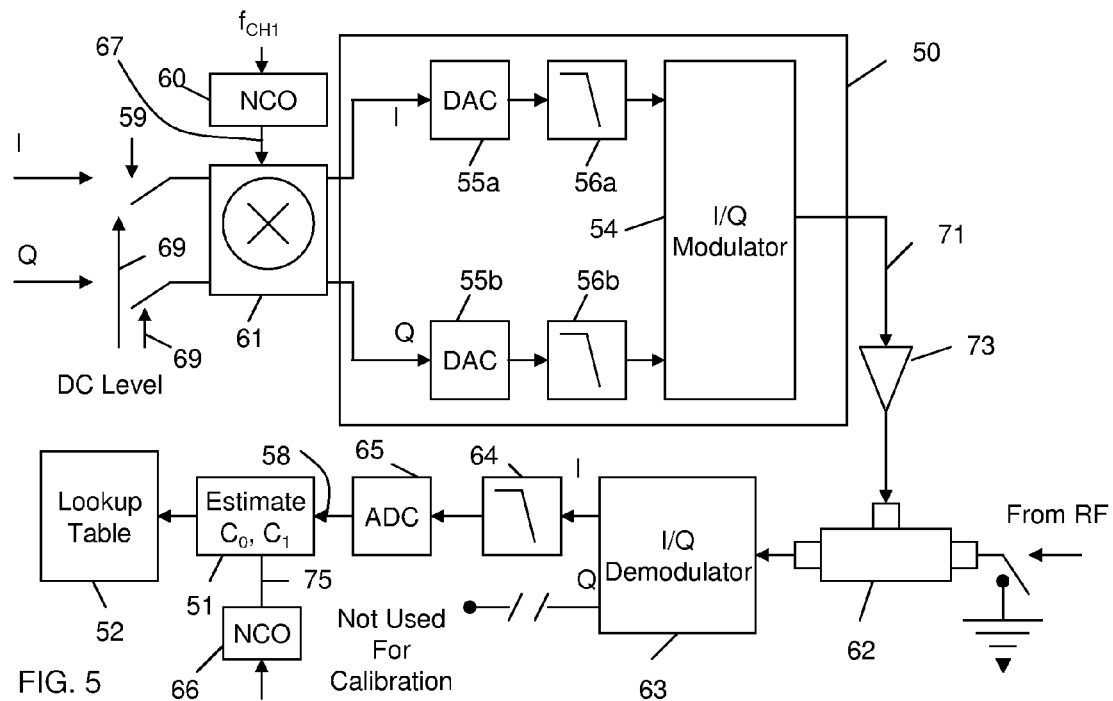
FIG. 5 is a block diagram of a preferred embodiment of a system for estimating Tx-correction coefficients for calibrating a transmitter that is adapted for modulating one or more signal carriers for transmission with modulating signals that are provided at one or more of a plurality of different modulation frequencies.

Referring to FIG. 5, Tx-correction coefficients $C_0$, $C_1$ for calibrating a transmitter 50 are estimated in accordance with a preferred embodiment of the present invention by using a Tx-correction-coefficient-estimation system 51. The Tx-correction-coefficient-estimation system 51 is the same as or functionally equivalent to the Rx-correction-coefficient-estimation system 10 described with reference to FIG. 1. The Tx-correction-coefficient-estimation system 51 provides estimated Tx-correction coefficients $C_0$, $C_1$ for calibrating the transmitter 50 to compensate for a frequency-dependent imbalance in the amplitude and/or the quadrature phase of analog in-phase (I) and quadrature (Q) signal components that are passed through transmitter circuit paths that may cause such imbalance. The estimated Tx-correction coefficients $C_0$, $C_1$ are stored in a lookup table 52.

Figure 6:
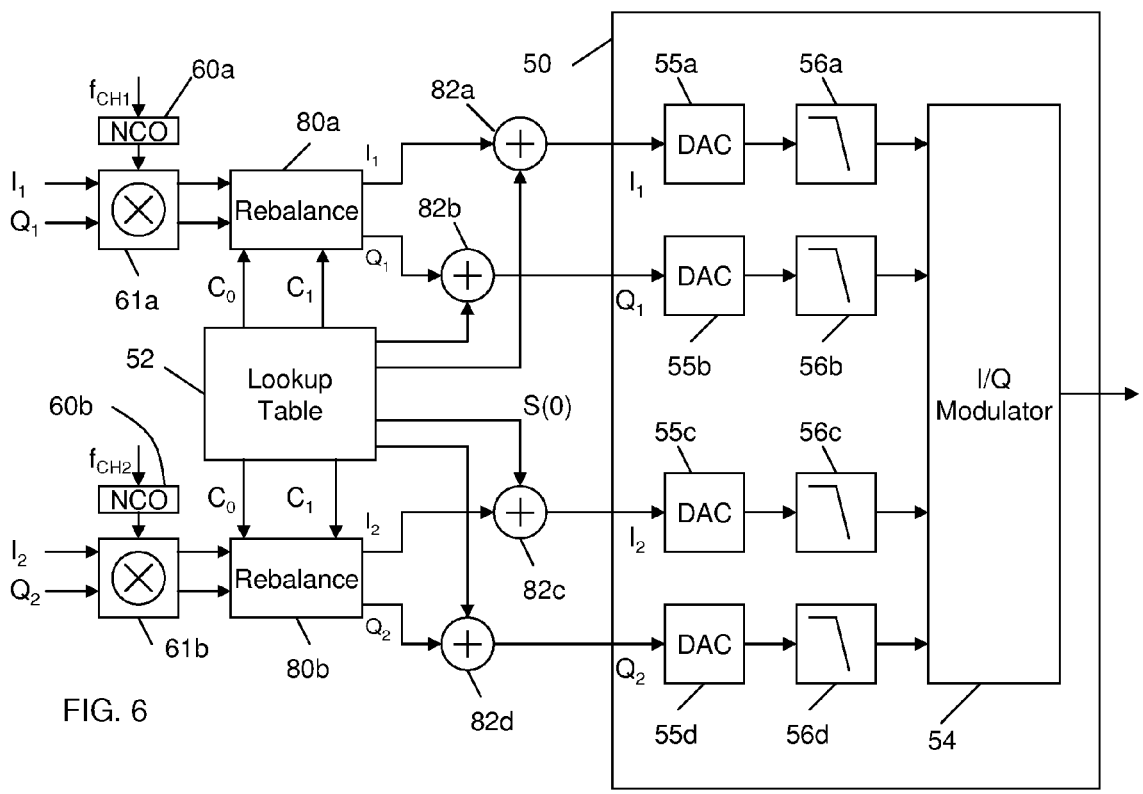
FIG. 6 is a block diagram of a system for calibrating the transmitter shown in the system of FIG. 5.

The transmitter 50 is adapted for modulating one or more signal carriers for transmission with modulating signals that are provided at variable modulation frequencies. The transmitter 50 includes an I/Q modulator (tuner) 54, a first I-channel DAC 55a, a first Q-channel DAC 55b, a first I-channel low-pass filter 56a and a first Q-channel low-pass filter 56b. The transmitter 50 also includes a second I-channel DAC 55c, a second Q-channel DAC 55d, a second I-channel low-pass filter 56c and a second Q-channel low-pass filter 56d, as shown in FIG. 6. In alternative embodiments the transmitter 50 includes respective I-and-Q-channel DACs and low-pass filters for each of the different modulation frequencies for which the transmitter 50 is adapted. The transmitter 50 can simultaneously transmit signals that are modulated at different frequencies.

The circuit paths of the transmitter 50 that may cause the above-described frequency dependent imbalance include the DACs, the low-pass filters and the I/Q modulator 54.

The Tx-correction-coefficient-estimation system 51 estimates the Tx-correction coefficients $C_0$, $C_1$ at a plurality of different calibration frequencies within a Tx-calibration bandwidth by processing samples of at least the digital I component of demodulated Tx-test signals 58 having the different calibration frequencies. The digital I components of the demodulated Tx-test signals are provided by analog-to-digital conversion of analog I components of demodulated Tx-test signals that are demodulated from a signal carrier that is modulated by analog I and Q components of Tx-test signals at the different calibration frequencies that are passed through the transmitter circuit paths that may cause the frequency-dependent I/Q imbalance.

The demodulated Tx-test signals 58 are provided by using the transmitter 50, a switching device 59, a first numerically-controlled oscillator (NCO) 60, a mixer 61, a coupler 62, an I/Q demodulator 63, a low-pass filter 64, an ADC 65 and a second NCO 66.

The NCO 60 and the mixer 61 preferably are such as the NCO 60a and the mixer, 61a (shown in FIG. 6), that are used with the transmitter 50 during normal operation of the transmitter 50, wherein the NCO 60a provides a signal 67 at a first channel modulation frequency; and the mixer 61a mixes upsampled baseband I and Q components with the channel-modulation-frequency signal 67 in order to provide I and Q components at the channel modulation frequency for modulation of a signal carrier by the I/Q modulator 54 of the transmitter 50, as shown in FIG. 6. In alternative embodiments, the NCO 60 and/or the mixer 61 are other than the NCO 60a and the mixer 61a that are used with the transmitter 50 during normal operation of the transmitter 50.

The I/Q demodulator 63, the low-pass filter 64 and the ADC 65 preferably are the same as or functionally equivalent to the I/Q demodulator 16, the I-channel filter 17a and I-channel ADC 18a of a receiver 11 that is used for receiving signals transmitted by the transmitter 50. In alternative embodiments the I/Q demodulator 63, a low-pass filter 64 and/or the ADC 65 preferably are not the same as or functionally equivalent to the I/Q demodulator 16, the I-channel filter 17a and I-channel ADC 18a of a receiver 11 that is used in a common communication system with the transmitter 50.

In order to generate the text signals 58, the switching device 59 is positioned as shown in FIG. 5 to pass a DC offset signal 69 to the I-channel and Q-channel inputs of the mixer 61; and the NCO 60 provides the channel-modulation-frequency signal 67 that is generated at a plurality of different calibration frequencies within the Tx-calibration bandwidth. The mixer 61 separately mixes the DC offset signals 69 provided to the respective I and Q inputs of the mixer 61 with the channel-modulation-frequency signals 67 to provide modulating I and Q test signals at the different Tx-calibration frequencies.

The modulating I and Q test signals are passed through the circuit paths 55a, 56a, 55b, 56b, 54 of the transmitter 50 that may cause the frequency-dependent imbalance. The I/Q modulator 54 modulates a signal carrier with the signals at the different Tx-calibration frequencies that are passed through the transmitter circuit paths 55a, 56a, 55b, 56b, 54 and thereby provides a sequence of test signals 71 that are modulated at the different Tx-calibration frequencies.

The modulated test signals 71 are passed through an amplifier 73 that attenuates the modulated test signals 71 to prevent saturation of the ADC 65. The attenuated test signals are provided via the coupler 62 to the I/Q demodulator 63. The I/Q demodulator 63 demodulates the modulated test signals 71 to provide demodulated I and Q components of a demodulated test signal. In the preferred embodiment, only the I component is used for estimating the Tx-correction coefficients. In alternative embodiments (not shown) both the I component and the Q component are used for the estimating the Tx-correction coefficients The demodulated I component of the demodulated test signals at the different Tx-calibration frequencies is passed through the low-pass filter 64 and the ADC 65 to eliminate Rx chain imbalance effects and thereupon provide the samples 58 of the digital I component of demodulated Tx-test signals that are processed by the Tx-correction-coefficient-estimation system 51 to estimate I-channel and Q-channel Tx-correction coefficients at each of the different Tx-calibration frequencies within the Tx-calibration bandwidth.

The Tx-correction-coefficient-estimation system 51 processes the samples 58 of the digital I component of demodulated Tx-test signals with a signal 75 provided from the second NCO 66 at an input frequency of either the calibration frequency $f_c$ or minus $f_c$ to provide the estimated I-channel and Q-channel Tx-correction coefficients $C_0$, $C_1$ for each of the different calibration frequencies. The Tx-correction-coefficient-estimation system 51 processes the samples 58 with the signal 75 by the same process as the Rx-correction-coefficient-estimation system 10 processes the samples of the Rx-test signals provided to the input of the mixer 13 with the signals provided from the NCO 24 in the embodiment described above with reference to FIGS. 1, 3A, 3B and 3C to provide the Rx-correction coefficients.

The Tx-correction-coefficient-estimation system 51 also processes samples of the DC offset signal at DC in the same as the Rx-correction-coefficient-estimation system 10 processed such signals to thereby provide for the respective I and Q components a metric S(0), which is a measurement of the DC offset of the particular I/Q component. The samples of the DC offset signal that are processed at DC by the Tx-correction-coefficient-estimation system 51 are (a) derived from the DC offset signal 69 and passed through the circuit paths of the transmitter 50, (b) used by the I/Q modulator 54 to modulate a signal carrier, (c) demodulated by the I/Q demodulator 63 and (d) passed through the low-pass filter 64 and the ADC 65.

The Tx-correction-coefficient-estimation system 51 also causes the Tx-correction coefficients $C_0$, $C_1$ for each of the different calibration frequencies within the Tx-calibration bandwidth to be stored in the lookup table 52.

The Tx-correction-coefficient-estimation system 51 also causes the I and Q-channel metrics S(0) for the DC offset to be stored in the lookup table 52. The same metric S(0) for the respective I/Q-channel is applicable for all of the different calibration frequencies.

Referring to FIG. 6, a preferred embodiment of a system for calibrating the receiver 50 includes first and second rebalancing circuits 80a, 80b a first I-channel digital addition unit 82a, a first Q-channel digital addition unit 82b, a second I-channel digital-addition unit 82c, a second Q-channel digital addition unit 82d and the lookup table 52. The first I-channel digital addition unit 82a is connected between the I-channel output of the first rebalancing circuit 80a and the input of the first I-channel DAC 55a of the transmitter 50. The first Q-channel digital addition unit 82b is connected between the Q-channel output of the first rebalancing circuit 80a and the input of the first Q-channel DAC 55b of the transmitter 50. The second I-channel digital addition unit 82c is connected between the I-channel output of the second rebalancing circuit 80b and the input of the second I-channel DAC 55c of the transmitter 50. The second Q-channel digital addition unit 82d is connected between the Q-channel output of a second rebalancing circuit 80b and the input of the second I-channel DAC 55c of the transmitter 50.

The modulating signals are provided to I-channel and Q-channel inputs of the first and second rebalancing circuits 80b, 80b respectively from a first mixer 61a and a second mixer 61b. The mixers 61a, 61b respectively mix upsampled baseband I and Q components with the channel-modulation-frequency signals 67a, 67b from the NCO 60a, 60b to provide the modulating signals at modulation frequencies determined by digital word inputs to the respective NCO 60a, 60b.

Each of the rebalancing circuits 80a, 80b is calibrated to compensate for frequency-dependent imbalance at a respectively different selected calibration frequency. Each rebalancing circuit 80a, 80b is substantially the same as the rebalancing circuits 30a, 30, 30c, 30d described above with reference o FIG. 4.

In alternative embodiments (not shown), there may be other than two rebalancing circuits. The number of rebalancing circuits may be in accordance with the number of modulation frequencies at which the transmitter is adapted for the signal carrier when such number is fixed. For example, in an embodiment in which the transmitter is adapted for modulating a carrier signal at a single modulation frequency, there is only one rebalancing circuit.

The metric S(0) for the I-channel is added by the first I-channel digital addition unit 82a to the digital I-component of the signal provided at the I-channel output of the first rebalancing circuit 80a to compensate for the DC offset of the low pass filter 56a in the transmitter 50. The metric S(0) for the Q-channel is added by the first Q-channel digital addition unit 82b to the digital Q-component of the signal provided at the Q-channel output of the first rebalancing circuit 80a to compensate for the DC offset of the low pass filter 56b in the transmitter 50. The metric S(0) for the I-channel also is added by the second I-channel digital addition unit 82c to the digital I-component of the signal provided at the I-channel output of the second rebalancing circuit 80b to compensate for the DC offset of the low pass filter 56c in the transmitter 50. The metric S(0) for the Q-channel also is added by the second Q-channel digital addition unit 82d to the digital Q-component of the signal provided at the Q-channel output of the second rebalancing circuit 80b to compensate for the DC offset of the low pass filter 56d in the transmitter 50.

The look-up table 52 is accessed to provide the estimated Tx-correction coefficients $C_0$, $C_1$ for calibrating the transmitter 50 for one or more of a plurality of different transmitter modulation frequencies within the Tx-calibration bandwidth, by selecting the estimated Tx-correction coefficients for the calibration frequency or frequencies within the Tx-calibration bandwidth that are the same as or closest to the respective modulation frequency or frequencies of the transmitter 50. The accessed estimated Tx-correction coefficients $C_0$, $C_1$ for a particular selected one of the different calibration frequencies are provided to the particular rebalancing circuit 80a, 80b that is calibrated to compensate for frequency-dependent imbalance at the particular selected calibration frequency.

The rebalancing circuits 80a, 80b use the accessed Tx-correction coefficients to calibrate the transmitter 50 so that for the respective modulation frequency or frequencies of the transmitter 50, the accessed estimated I-channel and Q-channel Tx-correction coefficients $C_0$, $C_1$ are combined with the digital I and Q components of a modulation signal before these digital I and Q components are converted by the DACs to analog components that pass through the transmitter circuit paths and modulate the signal carrier for transmission.

In at least one embodiment, at least a portion of the rebalancing circuits 80a, 80b and/or the frequency detection unit 84 are embodied in at least one computer, such as a microprocessor. A computer readable medium, which is provided for use with the computer, contains program instructions for causing the computer to perform one or more functions of the rebalancing circuits 80a, 80b and the frequency detection unit 84. In alternative embodiments, no portion of the rebalancing circuits 80a, 80b and/or the frequency detection unit 84 is embodied in a computer.

The benefits specifically stated herein do not necessarily apply to every conceivable embodiment of the present invention. Further, such stated benefits of the present invention are only examples and should not be construed as the only benefits of the present invention.

While the above description contains many specificities, these specificities are not to be construed as limitations on the scope of the present invention, but rather as examples of the preferred embodiments described herein. Other variations are possible and the scope of the present invention should be determined not by the embodiments described herein but rather by the claims and their legal equivalents. The claims require no implicit limitations. Each claim is to be construed explicitly as stated, or by its legal equivalent.

Regarding the method claims, except for those steps that can only occur in the sequence in which they are recited, and except for those steps for which the occurrence of a given sequence is specifically recited or must be inferred, the steps of the method claims do not have to occur in the sequence in which they are recited.

The invention claimed is:

1. A method of calibrating a receiver (Rx) to compensate for a frequency-dependent imbalance in the amplitude and/or the quadrature phase of analog in-phase (I) and quadrature (Q) received-signal components that have passed through receiver circuit paths that cause said imbalance, wherein the receiver is adapted for demodulating signal carriers at variable frequencies to provide received signals at one or more of a plurality of different received frequencies, the method comprising the steps of:

(a) processing samples of digital I and Q components of Rx-test signals generated at a plurality of different calibration frequencies within an Rx-calibration bandwidth to thereby estimate I-channel and Q-channel Rx-correction coefficients for each of the different calibration frequencies, wherein the digital I and Q components are provided by analog-to-digital conversion of analog I and Q components of the Rx-test signals that have been passed through said receiver circuit paths;

(b) in a look-up table, storing the estimated Rx-correction coefficients for the different calibration frequencies within the Rx-calibration bandwidth;

(c) from the look-up table, accessing estimated Rx-correction coefficients for calibrating the receiver for one or more of a plurality of signals at different received frequencies within the Rx-calibration bandwidth, by selecting the estimated Rx-correction coefficients for the calibration frequency or frequencies within the Rx-calibration bandwidth that are the same as or closest to the respective received frequency or frequencies; and (d) using the accessed Rx-correction coefficients to calibrate the receiver so that for the respective received frequency or frequencies the accessed estimated I-channel and Q-channel Rx-correction coefficients are combined with digital I and Q components of received signals that have been provided by analog-to-digital conversion of analog I and Q components of received signals that have passed through said receiver circuit paths upon demodulation at the received frequency.

2. A method according to claim 1, wherein step (a) comprises the steps of:

(e) mixing the samples with signals of said different calibration frequencies to provide mixed samples at DC; and (f) filtering the mixed samples at DC to provide metrics that are used for estimating the Rx-correction coefficients.

3. The method of claim 1 further comprising a method of calibrating a transmitter (Tx) to compensate for a frequency-dependent imbalance in the amplitude and/or the quadrature phase of analog in-phase (I) and quadrature (Q) signal components that are passed through transmitter circuit paths that cause said imbalance, wherein the transmitter is adapted for modulating one or more signal carriers for transmission with modulating signals that are provided at variable modulation frequencies, the method of calibrating the transmitter comprising the steps of:

(e) providing samples of at least the digital I components of demodulated Tx-test signals at a plurality of different calibration frequencies within a Tx-calibration bandwidth, wherein the samples of the digital I components of the demodulated Tx-test signals are provided by analog-to-digital conversion of the analog I components of demodulated Tx-test signals that are demodulated from signal carriers that are modulated at the different calibration frequencies by analog I and Q components that are passed through said transmitter circuit paths;

(f) processing the samples of said at least the digital I component of demodulated Tx-test signals to estimate I-channel and Q-channel Tx-correction coefficients at each of the different calibration frequencies within the Tx-calibration bandwidth;

(g) in a second look-up table, storing the estimated Tx-correction coefficients for the different calibration frequencies within the Tx-calibration bandwidth;

(h) from the second look-up table, accessing estimated Tx-correction coefficients for calibrating the transmitter for one or more different modulation frequencies within the Tx-calibration bandwidth, by selecting the estimated Tx-correction coefficients for the calibration frequency or frequencies within the Tx-calibration bandwidth that are the same as or closest to the respective modulation frequency or frequencies; and (i) using the accessed Tx-correction coefficients to calibrate the transmitter so that for the respective modulation frequency or frequencies of the transmitter, the accessed estimated I-channel and Q-channel Tx-correction coefficients are combined with digital I and Q components of a modulation signal before said digital components are converted to analog components that pass through the transmitter circuit paths.

4. The method according to claim 3, wherein the Tx-correction coefficients are estimated pursuant to step (f) by a process that is substantially the same as the process that is used to estimate the Rx-correction coefficients pursuant to step (a).

5. A method of calibrating a transmitter (Tx) to compensate for a frequency-dependent imbalance in the amplitude and/or the quadrature phase of analog in-phase (I) and quadrature (Q) signal components that are passed through transmitter circuit paths that cause said imbalance, wherein the transmitter is adapted for modulating one or more signal carriers for transmission with modulating signals that are provided at variable modulation frequencies, the method comprising the steps of:

(a) providing samples of at least the digital I components of demodulated Tx-test signals at a plurality of different calibration frequencies within a Tx-calibration bandwidth, wherein the samples of the digital I components of the demodulated Tx-test signals are provided by analog-to-digital conversion of the analog I components of demodulated Tx-test signals that are demodulated from signal carriers that are modulated at the different calibration frequencies by analog I and Q components that are passed through said transmitter circuit paths;

(b) processing the samples to estimate I-channel and Q-channel Tx-correction coefficients at each of the different calibration frequencies within the Tx-calibration bandwidth;

(c) in a look-up table, storing the estimated Tx-correction coefficients for the different calibration frequencies within the Tx-calibration bandwidth;

(d) from the look-up table, accessing estimated Tx-correction coefficients for calibrating the transmitter for one or more of a plurality of different modulation frequencies within the Tx-calibration bandwidth, by selecting the estimated Tx-correction coefficients for the calibration frequency or frequencies within the Tx-calibration bandwidth that are the same as or closest to the respective modulation frequency or frequencies; and (e) using the accessed Tx-correction coefficients to calibrate the transmitter so that for the respective modulation frequency or frequencies of the transmitter, the accessed estimated I-channel and Q-channel Tx-correction coefficients are combined with digital I and Q components of a modulation signal before said digital components are converted to analog components that pass through the transmitter circuit paths.

6. A method according to claim 5, wherein step (a) comprises the steps of:
(f) mixing the samples with signals of different frequencies in order to provide mixed samples at DC; and
(g) filtering the mixed samples at DC to provide metrics that are used for estimating the Tx-correction coefficients.

7. A method of estimating Rx-correction coefficients for calibrating a receiver (Rx) to compensate for a frequency-dependent imbalance in the amplitude and/or the quadrature phase of analog in-phase (I) and quadrature (Q) received-signal components that have passed through receiver circuit paths that cause said imbalance by combining estimated I-channel and Q-channel Rx-correction coefficients with digital I and Q components of a received signal at a received frequency that have been provided by analog-to-digital conversion of analog I and Q components of the received signal that have passed through said receiver circuit paths, the method comprising the steps of:
(a) providing digital I and Q components of an Rx-test signal at a selected calibration frequency that is the same as said received frequency, wherein the digital I and Q components of the Rx-test signal are provided by analog-to-digital conversion of analog I and Q components at the selected calibration frequency that have passed through said receiver circuit paths;
(b) processing the samples of the provided digital I and Q components of the Rx-test signal to thereby estimate I-channel and Q-channel Rx-correction coefficients for the selected calibration frequency;
wherein step (b) comprises the steps of:
(c) mixing the samples with signals of different calibration frequencies to provide mixed samples at DC; and
(d) filtering the mixed samples at DC to provide metrics that are used for estimating the Rx-correction coefficients.

8. A method according to claim 7, wherein step (c) comprises the steps of:
(e) providing mixed samples for the selected Rx-calibration frequency at DC; and
(f) providing mixed samples for the image of the selected Rx-calibration frequency at DC;
wherein step (d) comprises the steps of:
(g) providing a metric S(1), which is an integrated measured value of the mixed samples for the selected Rx-calibration frequency at DC; and
(h) providing a metric S(3), which is an integrated measured value of the mixed samples for the image of the selected Rx-calibration frequency at DC; and
wherein step (a) further comprises the steps of:
(i) estimating the I-channel Rx-correction coefficient, $C_0$ by calculating:

$$1 - \text{Re}\left\{\frac{2 \cdot S(3)}{S*(1) + S(3)}\right\} = $$
$$1 - \frac{2[S_I^2(3) + S_Q^2(3) + S_I(3)S_I(1) - S_Q(3)S_Q(1)]}{[S_I(1) + S_I(3)]^2 + [S_Q(3) - S_Q(1)]^2}$$

and
(j) estimating the Q-channel Rx-correction coefficient, $C_1$ by calculating:

$$-\text{Im}\left\{\frac{2 \cdot S(3)}{S*(1) + S(3)}\right\} = 1 - \frac{2[S_I(3)S_Q(1) + S_Q(3)S_I(1)]}{[S_I(1) + S_I(3)]^2 + [S_Q(3) - S_Q(1)]^2},$$

where: $S*(1)$ is the conjugate of $S(1)$, $S_I(1)$ is the filtered $S(1)$ I metric, $S_Q(1)$ is the filtered $S(1)$ Q metric, $S_I(3)$ is the filtered $S(3)$ I metric, and $S_Q(3)$ is the filtered $S(3)$ Q metric.

9. A method of calibrating a receiver (Rx) to compensate for a frequency-dependent imbalance in the amplitude and/or the quadrature phase of analog in-phase (I) and quadrature (Q) received-signal components that have passed through receiver circuit paths that cause said imbalance, wherein the receiver is adapted for demodulating signal carriers at variable frequencies to provide received signals at one or more of a plurality of different received frequencies, the method comprising the steps of:
(a) from a look-up table that stores estimated Rx-correction coefficients for different calibration frequencies within an Rx-calibration bandwidth, accessing estimated Rx-correction coefficients for calibrating the receiver for one or more of a plurality of different received frequencies within the Rx-calibration bandwidth, by selecting the estimated Rx-correction coefficients for the calibration frequencies within the Rx-calibration bandwidth that are the same as or closest to the respective received frequency or frequencies; and
(b) using the accessed Rx-correction coefficients to calibrate the receiver so that for the respective received frequency or frequencies the accessed estimated I-channel and Q-channel Rx-correction coefficients are combined with digital I and Q components of received signals that have been provided by analog-to-digital conversion of analog I and Q components of received signals that have passed through said receiver circuit paths upon demodulation at the received frequency.

10. A method of estimating Tx-correction coefficients for calibrating a transmitter (Tx) to compensate for a frequency-dependent imbalance in the amplitude and/or the quadrature phase of analog in-phase (I) and quadrature (Q) signal components that are passed through transmitter circuit paths that cause said imbalance by combining estimated I-channel and Q-channel Tx-correction coefficients with digital I and Q components of a modulating signal at a modulation frequency before said digital components are converted to analog components that pass through the transmitter circuit path, the method comprising the steps of:
(a) providing samples of at least the digital I component of a demodulated Tx-test signal at a selected calibration frequency that is the same as said modulation frequency, wherein the samples of the digital I components of the demodulated Tx-test signal are provided by analog-to-digital conversion of the analog I components of a Tx-test signal that is demodulated from a signal carrier that is modulated at the selected calibration frequency by analog I and Q components that are passed through said transmitter circuit paths; and
(b) processing the samples of at least the digital I component of the Tx-test signal to thereby estimate I-channel and Q-channel Tx-correction coefficients for the selected calibration frequency;

wherein step (b) comprises the steps of:
(c) mixing the samples with signals of different calibration frequencies to provide mixed samples at DC; and
(d) filtering the mixed samples at DC to provide metrics that are used for estimating the Rx-correction coefficients.

11. A method according to claim 10, wherein step (c) comprises the steps of:
(e) providing mixed samples for the selected Tx-calibration frequency at DC; and
(f) providing mixed samples for the image of the selected Rx-calibration frequency at DC;
wherein step (d) comprises the steps of:
(g) providing a metric $S(1)$, which is an integrated measured value of the mixed samples for the selected Tx-calibration frequency at DC; and
(h) providing a metric $S(3)$, which is an integrated measured value of the mixed samples for the image of the selected Tx-calibration frequency at DC; and
wherein step (b) further comprises the steps of:
(i) estimating the I-channel Tx-correction coefficient, $C_0$ by calculating:

$$1 - \text{Re}\left\{\frac{2 \cdot S(3)}{S*(1) + S(3)}\right\} = \\ 1 - \frac{2[S_I^2(3) + S_Q^2(3) + S_I(3)S_I(1) - S_Q(3)S_Q(1)]}{[S_I(1) + S_I(3)]^2 + [S_Q(3) - S_Q(1)]^2};$$

and
(j) estimating the Q-channel Tx-correction coefficient, $C_1$ by calculating:

$$-\text{Im}\left\{\frac{2 \cdot S(3)}{S*(1) + S(3)}\right\} = 1 - \frac{2[S_I(3)S_Q(1) + S_Q(3)S_I(1)]}{[S_I(1) + S_I(3)]^2 + [S_Q(3) - S_Q(1)]^2},$$

where: $S*(1)$ is the conjugate of $S(1)$, $S_I(1)$ is the filtered $S(1)$ I metric, $S_Q(1)$ is the filtered $S(1)$ Q metric, $S_I(3)$ is the filtered $S(3)$ I metric, and $S_Q(3)$ is the filtered $S(3)$ Q metric.

12. A method of calibrating a transmitter (Tx) to compensate for a frequency-dependent imbalance in the amplitude and/or the quadrature phase of analog in-phase (I) and quadrature (Q) signal components that are passed through transmitter circuit paths that cause said imbalance, wherein the transmitter is adapted for modulating one or more signal carriers for transmission with modulating signals that are provided at variable modulation frequencies, the method comprising the steps of:
(a) from a look-up table that stores estimated Tx-correction coefficients for different calibration frequencies within a Tx-calibration bandwidth, accessing estimated Tx-correction coefficients for calibrating the transmitter for one or more of a plurality of different modulation frequencies within the Tx-calibration bandwidth, by selecting the estimated Tx-correction coefficients for the calibration frequencies within the Tx-calibration bandwidth that are the same as or closest to the respective modulation frequency or frequencies; and
(b) using the accessed Tx-correction coefficients to calibrate the transmitter so that for the respective modulation frequency or frequencies of the transmitter, the accessed estimated I-channel and Q-channel Tx-correction coefficients are combined with digital I and Q components of a modulation signal before said digital components are converted to analog components that pass through the transmitter circuit path paths.

13. A system for calibrating a receiver (Rx) to compensate for a frequency-dependent imbalance in the amplitude and/or the quadrature phase of analog in-phase (I) and quadrature (Q) received-signal components that have passed through receiver circuit paths that cause said imbalance, wherein the receiver is adapted for demodulating signal carriers at variable frequencies to provide received signals at one or more of a plurality of different received frequencies, the system comprising:
means for processing samples of digital I and Q components of Rx-test signals generated at a plurality of different calibration frequencies within an Rx-calibration bandwidth to thereby estimate I-channel and Q-channel Rx-correction coefficients for each of the different calibration frequencies, wherein the digital I and Q components are provided by analog-to-digital conversion of analog I and Q components of the Rx-test signals that have been passed through said receiver circuit paths;
a look-up table for storing the estimated Rx-correction coefficients for the different calibration frequencies within the Rx-calibration bandwidth;
means for calibrating the receiver for one or more of a plurality of signals at different received frequencies within the Rx-calibration bandwidth by combining Rx-correction coefficients accessed from the look-up table with digital I and Q components of received signals that have been provided by analog-to-digital conversion of analog I and Q components of received signals that have passed through said receiver circuit paths upon demodulation at the received frequency;
wherein the accessed Rx-correction coefficients are selected for the calibration frequency or frequencies within the Rx-calibration bandwidth that are the same as or closest to the respective received frequency or frequencies.

14. A system according to claim 13, wherein the processing means comprise:
means for mixing the samples with signals of said different calibration frequencies to provide mixed samples at DC; and
means for filtering the mixed samples at DC to provide metrics that are used for estimating the Rx-correction coefficients.

15. A system for calibrating a transmitter (Tx) to compensate for a frequency-dependent imbalance in the amplitude and/or the quadrature phase of analog in-phase (I) and quadrature (Q) signal components that are passed through transmitter circuit paths that cause said imbalance, wherein the transmitter is adapted for modulating one or more signal carriers for transmission with modulating signals that are provided at variable modulation frequencies, the system:
means for providing samples of at least the digital I components of demodulated Tx-test signals at a plurality of different calibration frequencies within a Tx-calibration bandwidth, wherein the samples of the digital I components of the demodulated Tx-test signals are provided by analog-to-digital conversion of the analog I components of demodulated Tx-test signals that are demodulated from signal carriers that are modulated at the different calibration frequencies by analog I and Q components that are passed through said transmitter circuit paths;

means for processing the samples to estimate I-channel and Q-channel Tx-correction coefficients at each of the different calibration frequencies within the Tx-calibration bandwidth;
a look-up table, storing the estimated Tx-correction coefficients for the different calibration frequencies within the Tx-calibration bandwidth;
means for calibrating the transmitter for one or more of a plurality of different modulation frequencies within the Tx-calibration bandwidth by combining Tx-correction coefficients accessed from the look-up table with digital I and Q components of a modulation signal before said digital components are converted to analog components that pass through the transmitter circuit paths;
wherein the accessed Tx-correction coefficients are selected for the calibration frequency or frequencies within the Tx-calibration bandwidth that are the same as or closest to the respective modulation frequency or frequencies.

16. A system according to claim 15, wherein the processing means comprise:
means for mixing the samples with signals of said different calibration frequencies to provide mixed samples at DC; and
means for filtering the mixed samples at DC to provide metrics that are used for estimating the Tx-correction coefficients.

17. A system for estimating Rx-correction coefficients for calibrating a receiver (Rx) to compensate for a frequency-dependent imbalance in the amplitude and/or the quadrature phase of analog in-phase (I) and quadrature (Q) received-signal components that have passed through receiver circuit paths that cause said imbalance by combining estimated I-channel and Q-channel Rx-correction coefficients with digital I and Q components of a received signal at a received frequency that have been provided by analog-to-digital conversion of analog I and Q components of the received signal that have passed through said receiver circuit paths, the system comprising:
means for providing digital I and Q components of an Rx-test signal at a selected calibration frequency that is the same as said received frequency, wherein the digital I and Q components of the Rx-test signal are provided by analog-to-digital conversion of analog I and Q components at the selected calibration frequency that have passed through said receiver circuit paths; and
means for processing the samples of the provided digital I and Q components of the Rx-test signal to thereby estimate I-channel and Q-channel Rx-correction coefficients for the selected calibration frequency;
wherein the processing means comprises:
means for mixing the samples with signals of said different calibration frequencies to provide mixed samples at DC; and
means for filtering the mixed samples at DC to provide metrics that are used for estimating the Rx-correction coefficients.

18. A system according to claim 17, wherein the mixing means comprise:
means for providing mixed samples for the selected Rx-calibration frequency at DC; and
means for providing mixed samples for the image of the selected Rx-calibration frequency at DC;
wherein the filtering means comprise:
means for providing a metric $S(1)$, which is an integrated measured value of the mixed samples for the selected Rx-calibration frequency at DC; and means for providing a metric $S(3)$, which is an integrated measured value of the mixed samples for the image of the selected Rx-calibration frequency at DC; and
wherein the processing means further comprises:
means for estimating the I-channel Rx-correction coefficient, $C_0$ by calculating:

$$1 - \text{Re}\left\{\frac{2 \cdot S(3)}{S*(1) + S(3)}\right\} = $$
$$1 - \frac{2[S_I^2(3) + S_Q^2(3) + S_I(3)S_I(1) - S_Q(3)S_Q(1)]}{[S_I(1) + S_I(3)]^2 + [S_Q(3) - S_Q(1)]^2};$$

and
means for estimating the Q-channel Rx-correction coefficient, $C_1$ by calculating:

$$-\text{Im}\left\{\frac{2 \cdot S(3)}{S*(1) + S(3)}\right\} = 1 - \frac{2[S_I(3)S_Q(1) + S_Q(3)S_I(1)]}{[S_I(1) + S_I(3)]^2 + [S_Q(3) - S_Q(1)]^2},$$

where: $S*(1)$ is the conjugate of $S(1)$, $S_I(1)$ is the filtered $S(1)$ I metric, $S_Q(1)$ is the filtered $S(1)$ Q metric, $S_I(3)$ is the filtered $S(3)$ I metric, and $S_Q(3)$ is the filtered $S(3)$ Q metric.

19. A system for calibrating a receiver (Rx) to compensate for a frequency-dependent imbalance in the amplitude and/or the quadrature phase of analog in-phase (I) and quadrature (Q) received-signal components that have passed through receiver circuit paths that cause said imbalance, wherein the receiver is adapted for demodulating signal carriers at variable frequencies to provide received signals at one or more of a plurality of different received frequencies, the system comprising:
means for calibrating the receiver for one or more of a plurality of signals at different received frequencies within the Rx-calibration bandwidth by combining Rx-correction coefficients accessed from a look-up table that stores estimated Rx-correction coefficients for different calibration frequencies within an Rx-calibration bandwidth with digital I and Q components of received signals that have been provided by analog-to-digital conversion of analog I and Q components of received signals that have passed through said receiver circuit paths upon demodulation at the received frequency;
wherein the accessed Rx-correction coefficients are selected for the calibration frequency or frequencies within the Rx-calibration bandwidth that are the same as or closest to the respective received frequency or frequencies.

20. A system for estimating Tx-correction coefficients for calibrating a transmitter (Tx) to compensate for a frequency-dependent imbalance in the amplitude and/or the quadrature phase of analog in-phase (I) and quadrature (Q) signal components that are passed through transmitter circuit paths that cause said imbalance by combining estimated I-channel and Q-channel Tx-correction coefficients with digital I and Q components of a modulating signal at a modulation frequency before said digital components are converted to analog components that pass through the transmitter circuit paths, the system comprising:
means for providing samples of at least the digital I component of a demodulated Tx-test signal at a selected calibration frequency that is the same as said modulation frequency, wherein the samples of the digital I components of the demodulated Tx-test signal are provided by analog-to-digital conversion of the analog I components of a Tx-test signal that is demodulated from a signal carrier that is modulated at the selected calibration frequency by analog I and Q components that are passed through said transmitter circuit paths; and means for processing the samples of at least the digital I component of the Tx-test signal to thereby estimate I-channel and Q-channel Tx-correction coefficients for the selected calibration frequency;

wherein the processing means comprise:

means for mixing the samples with signals of said different calibration frequencies to provide mixed samples at DC; and means for filtering the mixed samples at DC to provide metrics that are used for estimating the Tx-correction coefficients.

21. A system according to claim 20, wherein the mixing means comprise:

means for providing mixed samples for the selected Tx-calibration frequency at DC; and means for providing mixed samples for the image of the selected Tx-calibration frequency at DC;

wherein the filtering means comprise:

means for providing a metric $S(1)$, which is an integrated measured value of the mixed samples for the selected Tx-calibration frequency at DC; and means for providing a metric $S(3)$, which is an integrated measured value of the mixed samples for the image of the selected Rx-calibration frequency at DC; and wherein the processing means further comprises:

means for estimating the I-channel Tx-correction coefficient, $C_0$ by calculating:

$$1 - \text{Re}\left\{\frac{2 \cdot S(3)}{S*(1) + S(3)}\right\} = 1 - \frac{2[S_I^2(3) + S_Q^2(3) + S_I(3)S_I(1) - S_Q(3)S_Q(1)]}{[S_I(1) + S_I(3)]^2 + [S_Q(3) - S_Q(1)]^2};$$

and means for estimating the Q-channel Tx-correction coefficient, $C_1$ by calculating:

$$-\text{Im}\left\{\frac{2 \cdot S(3)}{S*(1) + S(3)}\right\} = 1 - \frac{2[S_I(3)S_Q(1) + S_Q(3)S_I(1)]}{[S_I(1) + S_I(3)]^2 + [S_Q(3) - S_Q(1)]^2},$$

where: $S*(1)$ is the conjugate of $S(1)$, $S_I(1)$ is the filtered $S(1)$ I metric, $S_Q(1)$ is the filtered $S(1)$ Q metric, $S_I(3)$ is the filtered $S(3)$ I metric, and $S_Q(3)$ is the filtered $S(3)$ Q metric.

22. A system for calibrating a transmitter (Tx) to compensate for a frequency-dependent imbalance in the amplitude and/or the quadrature phase of analog in-phase (I) and quadrature (Q) signal components that are passed through transmitter circuit paths that cause said imbalance, wherein the transmitter is adapted for modulating one or more signal carriers for transmission with modulating signals that are provided at variable modulation frequencies, the system comprising:

means for calibrating the transmitter for one or more of a plurality of signals at different modulation frequencies within the Tx-calibration bandwidth by combining Tx-correction coefficients accessed from a look-up table that stores estimated Tx-correction coefficients for different calibration frequencies within a Tx-calibration bandwidth with digital I and Q components of a modulation signal before said digital components are converted to analog components that pass through the transmitter circuit paths;

wherein the accessed Tx-correction coefficients are selected for the calibration frequency or frequencies within the Tx-calibration bandwidth that are the same as or closest to the respective modulation frequency or frequencies.

23. A non-transitory computer readable medium for use with one or more computers in a system for estimating Rx-correction coefficients for calibrating a receiver (Rx) to compensate for a frequency-dependent imbalance in the amplitude and/or the quadrature phase of analog in-phase (I) and quadrature (Q) received-signal components that have passed through receiver circuit paths that cause said imbalance by combining estimated I-channel and Q-channel Rx-correction coefficients with digital I and Q components of a received signal at a received frequency that have been provided by analog-to-digital conversion of analog I and Q components of the received signal that have passed through said receiver circuit paths, the system comprising: means for providing digital I and Q components of an Rx-test signal at a selected calibration frequency that is the same as said received frequency, wherein the digital I and Q components of the Rx-test signal are provided by analog-to-digital conversion of analog I and Q components at the selected calibration frequency that have passed through said receiver circuit paths; and means for processing the samples of the provided digital I and Q components of the Rx-test signal to thereby estimate I-channel and Q-channel Rx-correction coefficients for the selected calibration frequency; wherein the processing means comprise: means for mixing the samples with signals of different calibration frequencies as to provide mixed samples for the selected Rx-calibration frequency at DC; and means for providing mixed samples for the image of the selected Rx-calibration frequency at DC; and means for filtering the mixed samples at DC to provide a metric $S(1)$, which is a measured value of the mixed samples for the selected Rx-calibration frequency at DC and a metric $S(3)$, which is a measured value of the mixed samples for the image of the selected Rx-calibration frequency at DC;

wherein the computer readable medium contains program instructions for causing the processing means to estimate the I-channel Rx-correction coefficient, $C_0$ by calculating:

$$1 - \text{Re}\left\{\frac{2 \cdot S(3)}{S*(1) + S(3)}\right\} = 1 - \frac{2[S_I^2(3) + S_Q^2(3) + S_I(3)S_I(1) - S_Q(3)S_Q(1)]}{[S_I(1) + S_I(3)]^2 + [S_Q(3) - S_Q(1)]^2};$$

and to estimate the Q-channel Rx-correction coefficient, $C_1$ by calculating:

$$-\text{Im}\left\{\frac{2 \cdot S(3)}{S*(1) + S(3)}\right\} = 1 - \frac{2[S_I(3)S_Q(1) + S_Q(3)S_I(1)]}{[S_I(1) + S_I(3)]^2 + [S_Q(3) - S_Q(1)]^2},$$

where: $S^*(1)$ is the conjugate of $S(1)$, $S_I(1)$ is the filtered $S(1)$ I metric, $S_Q(1)$ is the filtered $S(1)$ Q metric, $S_I(3)$ is the filtered $S(3)$ I metric, and $S_Q(3)$ is the filtered $S(3)$ Q metric.

24. A non-transitory computer readable medium for use with one or more computers in a system for estimating Tx-correction coefficients for calibrating a transmitter (Tx) to compensate for a frequency-dependent imbalance in the amplitude and/or the quadrature phase of analog in-phase (I) and quadrature (Q) signal components that are passed through transmitter circuit paths that cause said imbalance by combining estimated I-channel and Q-channel Tx-correction coefficients with digital I and Q components of a modulating signal at a modulation frequency before said digital components are converted to analog components that pass through the transmitter circuit paths, the system comprising: means for providing samples of at least the digital I component of a demodulated Tx-test signal at a selected calibration frequency that is the same as said modulation frequency, wherein the samples of the digital I components of the demodulated Tx-test signal are provided by analog-to-digital conversion of the analog I components of a Tx-test signal that is demodulated from a signal carrier that is modulated at the selected calibration frequency by analog I and Q components that are passed through said transmitter circuit paths; and means for processing the samples of at least the digital I component of the Tx-test signal to thereby estimate I-channel and Q-channel Tx-correction coefficients for the selected calibration frequency; wherein the processing means comprise: means for mixing the samples with signals of different calibration frequencies as to provide mixed samples at DC; and means for filtering the mixed samples at DC to provide metrics that are used for estimating the Tx-correction coefficients wherein the mixing means comprise: means for providing mixed samples for the selected Tx-calibration frequency at DC; and means for providing mixed samples for the image of the selected Tx-calibration frequency at DC; and wherein the filtering means comprise: means for providing a metric $S(1)$, which is an integrated measured value of the mixed samples for the selected Tx-calibration frequency at DC; and means for providing a metric $S(3)$, which is an integrated measured value of the mixed samples for the image of the selected Rx-calibration frequency at DC;

wherein the computer readable medium contains program instructions for causing the processing means to estimate the I-channel Tx-correction coefficient, $C_0$ by calculating:

$$1 - \text{Re}\left\{\frac{2 \cdot S(3)}{S*(1) + S(3)}\right\} = 1 - \frac{2[S_I^2(3) + S_Q^2(3) + S_I(3)S_I(1) - S_Q(3)S_Q(1)]}{[S_I(1) + S_I(3)]^2 + [S_Q(3) - S_Q(1)]^2};$$

and to estimate the Q-channel Tx-correction coefficient, $C_1$ by calculating:

$$-\text{Im}\left\{\frac{2 \cdot S(3)}{S*(1) + S(3)}\right\} = 1 - \frac{2[S_I(3)S_Q(1) + S_Q(3)S_I(1)]}{[S_I(1) + S_I(3)]^2 + [S_Q(3) - S_Q(1)]^2};$$

where: $S^*(1)$ is the conjugate of $S(1)$, $S_I(1)$ is the filtered $S(1)$ I metric, $S_Q(1)$ is the filtered $S(1)$ Q metric, $S_I(3)$ is the filtered $S(3)$ I metric, and $S_Q(3)$ is the filtered $S(3)$ Q metric.

* * * * *